US012148996B2

(12) United States Patent
Miyagawa

(10) Patent No.: US 12,148,996 B2
(45) Date of Patent: Nov. 19, 2024

(54) SLOT ARRAY ANTENNA

(71) Applicant: Furuno Electric Co., Ltd., Nishinomiya (JP)

(72) Inventor: Tetsuya Miyagawa, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 127 days.

(21) Appl. No.: 17/969,708

(22) Filed: Oct. 20, 2022

(65) Prior Publication Data

US 2024/0039169 A1 Feb. 1, 2024

(30) Foreign Application Priority Data

Jul. 29, 2022 (EP) .................................... 22187821

(51) Int. Cl.
*H01Q 21/06* (2006.01)
*H01Q 13/02* (2006.01)
*H01Q 13/22* (2006.01)

(52) U.S. Cl.
CPC ....... *H01Q 21/064* (2013.01); *H01Q 13/0233* (2013.01); *H01Q 13/22* (2013.01)

(58) Field of Classification Search
CPC .... H01Q 21/064; H01Q 13/22; H01Q 19/028; H01Q 13/0233
See application file for complete search history.

(56) References Cited

U.S. PATENT DOCUMENTS 2,703,841 A * 3/1955 Purcell ............... H01Q 13/0233 343/778
2002/0000945 A1* 1/2002 Amyotte ............ H01Q 13/0208 343/786

FOREIGN PATENT DOCUMENTS

CN 115101937 A * 9/2022 ......... H01Q 13/0208
JP 5219139 B2 6/2013
NL 84 681 C 3/1957

OTHER PUBLICATIONS

Extended European Search Report issued Jan. 13, 2023 in corresponding European Patent Application No. 22187821.8, 10 pages.
(Continued)

*Primary Examiner* — Hoang V Nguyen
*Assistant Examiner* — Yonchan J Kim
(74) *Attorney, Agent, or Firm* — XSENSUS LLP

(57) ABSTRACT

A slot array antenna includes a waveguide and a horn. The waveguide has a first surface including multiple slots arranged along a longitudinal direction of the first surface to radiate radio waves. The width of the first surface in the lateral direction is greater than half of a wavelength of the radio waves. The horn, fixedly attached to the waveguide, enlarges towards a radiation direction of the radio waves. The horn has upper and lower portions bent inwards twice with respect to a lateral direction of the first surface to form first and second narrow openings. An opening width of the first narrow opening is less than the width of the first surface. An opening width of the second narrow opening is less than or equal to two fifth of the wavelength. Thus, a side lobe generated due to horizontal polarization of the radio waves is suppressed.

13 Claims, 7 Drawing Sheets

(56) References Cited

OTHER PUBLICATIONS

Alexander, M. J., "The Improvement of Sidelobe Performance of Slotted Waveguide Arrays", Marconi Review, vol. 45, No. 226, Jan. 1, 1982, pp. 165-188, XP001384899.
Kamisato et al., "Small and high-performance millimeter-wave antenna", Fujitsu Ten Technical Report, vol. 28 No. 2, pp. 19-25 (14 pages including English Translation).

* cited by examiner

600

SLOT ARRAY ANTENNA

CROSS-REFERENCE TO RELATED APPLICATION

This application claims priority under 35 U.S.C. § 119 to European Patent Application No. EP22187821.8, which was filed on Jul. 29, 2022, the entire disclosure of which is hereby incorporated by reference.

TECHNICAL FIELD

The present disclosure mainly relates to a marine radar for navigation of a ship, and more specifically to a slot array antenna for the marine radar.

BACKGROUND

Waveguide slot array antenna is mainstream antenna used for marine radar. Conventional marine antennas generally use a rectangular waveguide with multiple slots equipped with horns to improve directivity. Generally, a slot array antenna of an edge shunt system (horizontal polarization) of a particular shape is used for a marine radar.

A cross polarization suppression grating is used to suppress vertical polarization which is a cross polarization. It is known that horizontal polarization is more attenuated by rain than vertical polarization. Edge shunting requires a grating to suppress cross-polarization. A slot array antenna with a longitudinal shunt system of vertical polarization produces a side lobe of horizontal polarization in the direction of ±45°. A side lobe due to cross polarization (horizontal polarization) needs to be suppressed which is a problem in a slot array antenna of a longitudinal shunt system. For the aforementioned reasons, there is a need for providing a slot array antenna that overcomes the problems of conventional slot array antennas.

SUMMARY

In an embodiment of the present disclosure, there is provided a slot array antenna including a waveguide and a horn. The waveguide has a first surface including a plurality of slots arranged along a longitudinal direction of the first surface to radiate radio waves. The horn, fixedly attached to the waveguide, enlarges towards a radiation direction of the radio waves, and including an upper portion and a lower portion bent inwards with respect to a lateral direction of the first surface to form a first narrow opening. An opening width of the first narrow opening is less than the width of the first surface. The upper portion and the lower portion are further bent inwards along the lateral direction of the first surface to form a second narrow opening. An opening width of the second narrow opening is less than or equal to two fifth of the wavelength.

Additionally, or optionally, the opening width of the second narrow opening may be less than or equal to one fifth of the wavelength.

Additionally, or optionally, each of the upper and lower portions may have a first bend at an edge of the first surface inwards along the width of the first surface and a second bend along the radiation direction, thereby forming the first narrow opening.

Additionally, or optionally, each of the upper and lower portions may have a third bend at a predetermined distance from the second bend such that the third bend is inwards along the width of the first surface and a fourth bend along the radiation direction, thereby forming the second narrow opening.

Additionally, or optionally, the upper and lower portions of the horn may partially overlap with the first surface of the waveguide.

Additionally, or optionally, the waveguide may be an elongated hollow structure.

Additionally, or optionally, the hollow structure may be a rectangular hollow structure.

In another aspect of the present disclosure, there is provided a method for assembling a slot array antenna. The method includes forming a waveguide having a first surface including a plurality of slots arranged along a longitudinal direction of the first surface to radiate radio waves and forming a horn enlarging towards a radiation direction of the radio waves and comprising an upper portion and a lower portion bent inwards with respect to a lateral direction of the first surface to form a first narrow opening. The method further includes fixedly attaching the horn to the waveguide. The width of the first surface is greater than half of a wavelength of the radio waves. An opening width of the first narrow opening is less than the width of the first surface.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1:
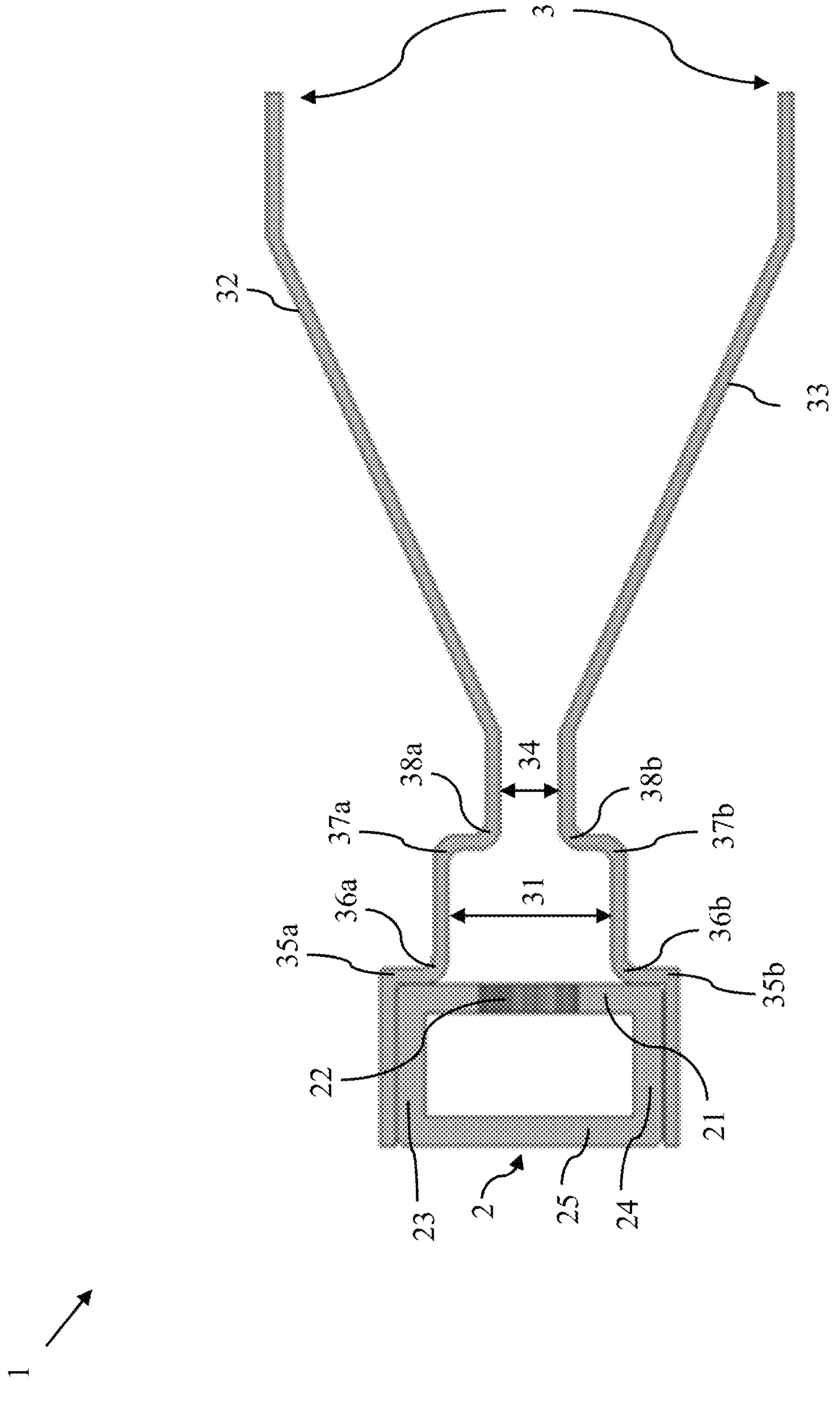
FIG. 1 illustrates a side view of a slot array antenna according to one embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
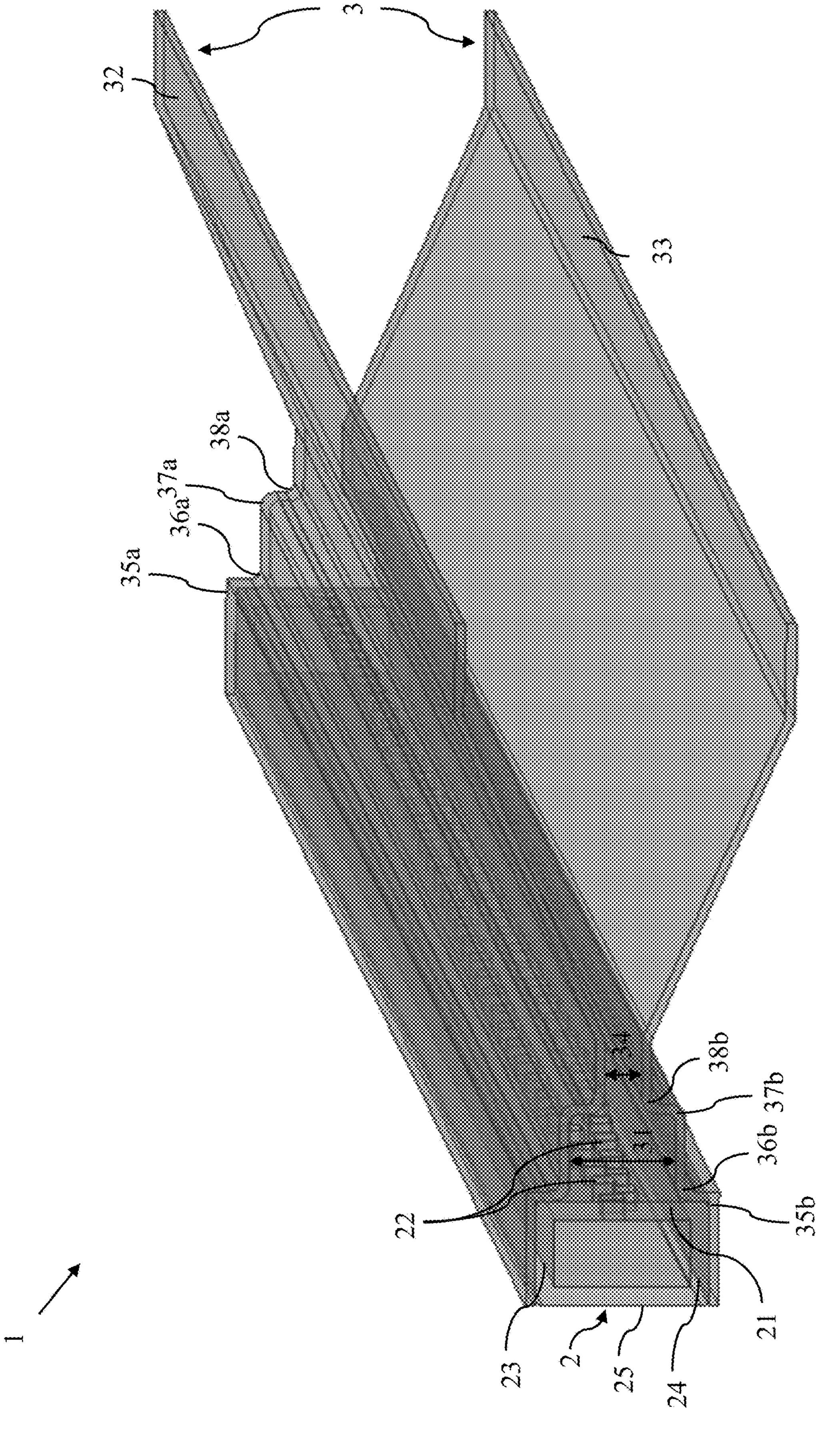
FIG. 2 illustrates a perspective view of a slot array antenna according to one embodiment of the present disclosure.

FIG. 1 illustrates a side view of a slot array antenna 1 according to one embodiment of the present disclosure. FIG. 2 illustrates a perspective view of the slot array antenna 1 according to one embodiment of the present disclosure. The slot array antenna 1 includes a waveguide 2 and a horn 3 which when assembled form the slot array antenna 1.

The waveguide 2 is an elongated hollow structural section which is rectangular in shape. The waveguide 2 has a first surface 21 including a plurality of slots 22 arranged along a longitudinal direction of the first surface 21 to radiate radio waves. The plurality of slots are longitudinal and are arranged on the first surface 21 parallelly at predetermined intervals along the longitudinal direction of the first surface 21. The width of the first surface 21 is greater than half of a wavelength (λ) of the radio waves. The waveguide 1 further has second, third and fourth surfaces 23, 24, and 25 such that the first through fourth surfaces 21 and 23-25 form the walls of the waveguide 2. In one embodiment, the wavelength is wavelength of free space.

It will be apparent to a person skilled in the art that although in the current embodiment, the width of the first surface 21 is greater than half of the wavelength, the scope of the present disclosure is not limited to it. In various other embodiments, the width of the first surface 21 may be any suitable width with respect to the wavelength, without deviating from the scope of the present disclosure.

The horn 3 is fixedly attached to the waveguide 2 such that the horn 3 opens in a radiation direction of the radio waves. The horn 3 enlarges towards a radiation direction of the radio waves and comprises an inward bend with respect to a lateral direction of the first surface 21 to form a first narrow opening 31. An opening width of the first narrow opening 31 is less than the width of the first surface 21. Thus, due to the first narrow opening 31 the horizontally polarized waves cannot propagate, as a result a side lobe generated due to horizontal polarization of the radio waves is suppressed.

It will be apparent to a person skilled in the art that although in the current embodiment, the opening width of the first narrow opening 31 is less than the width of the first surface 21, the scope of the present disclosure is not limited to it. In various other embodiments, the opening width of the first narrow opening 31 may be any suitable width with respect to the wavelength or the width of the first surface 21, without deviating from the scope of the present disclosure.

The horn 3 has an upper portion 32 and a lower portion 33 that are bent inwards twice with respect to the lateral direction of the first surface 21 to form the first narrow opening 31 and a second narrow opening 34. In one embodiment, an opening width of the second narrow opening 34 is less than or equal to two fifth of the wavelength. In another embodiment, the opening width of the second narrow opening 34 is less than or equal to one fifth of the wavelength. The upper and lower portions 32 and 33 form a horn shape along the radiation direction after the second narrow opening 34. In one embodiment, each of the upper and lower portions 32 and 33 has a first bend 35*a* or 35*b* at an edge of the first surface 21 inwards along the width of the first surface 21 and a second bend 36*a* or 36*b* along the radiation direction, respectively, thus, forming the first narrow opening 31.

It will be apparent to a person skilled in the art that although in the current embodiment, the opening width of the second narrow opening 34 is less than or equal to one fifth or two fifth of the wavelength, the scope of the present disclosure is not limited to it. In various other embodiments, the opening width of the second narrow opening 34 may be any suitable width with respect to the wavelength, without deviating from the scope of the present disclosure.

Each of the upper and lower portions 32 and 33 has a third bend 37*a* and 37*b* at a predetermined distance from the second bend 36*a* or 36*b* such that the third bend 37*a* or 37*b* is inwards along the width of the first surface 21 and a fourth bend 38*a* or 38*b* along the radiation direction, respectively, thus, forming the second narrow opening 34. In one embodiment, the upper and lower portions 32 and 33 of the horn 3 partially overlap with the first surface 21 of the waveguide 2. The upper and lower portions 32 and 33 of the horn 3 further overlap with the second and third surfaces 23 and 24 of the waveguide 2, respectively. The first through fourth bends are bends.

The waveguide 2 and the horn 3 are metal sheets that are bent and punched to shape to form desired design for the respective plates. In one embodiment, the waveguide 2 and the horn 3 are made of same metal. In another embodiment, the waveguide 2 and the horn 3 are made of different metals. In one embodiment, the waveguide 2 and the horn 3 have same thickness.

When the slot array antenna 1 is utilized for radiation of the radio waves with the first narrow opening 31, the sidelobe suppression effect was insufficient in case of the machining error occurring, thus, the second narrow opening 34 is included to form a two-step folded shape such that a gap between the horns at the second narrow opening 34 is less than or equal to one fifth of the wavelength. Since the one-step bend interferes with the plurality of slot 22, the opening width of the first narrow opening 31 between the upper and lower portions 32 and 33 of the horn 3 cannot be narrowed, so the two-step bend is included in the slot array antenna 1.

Figure 3:
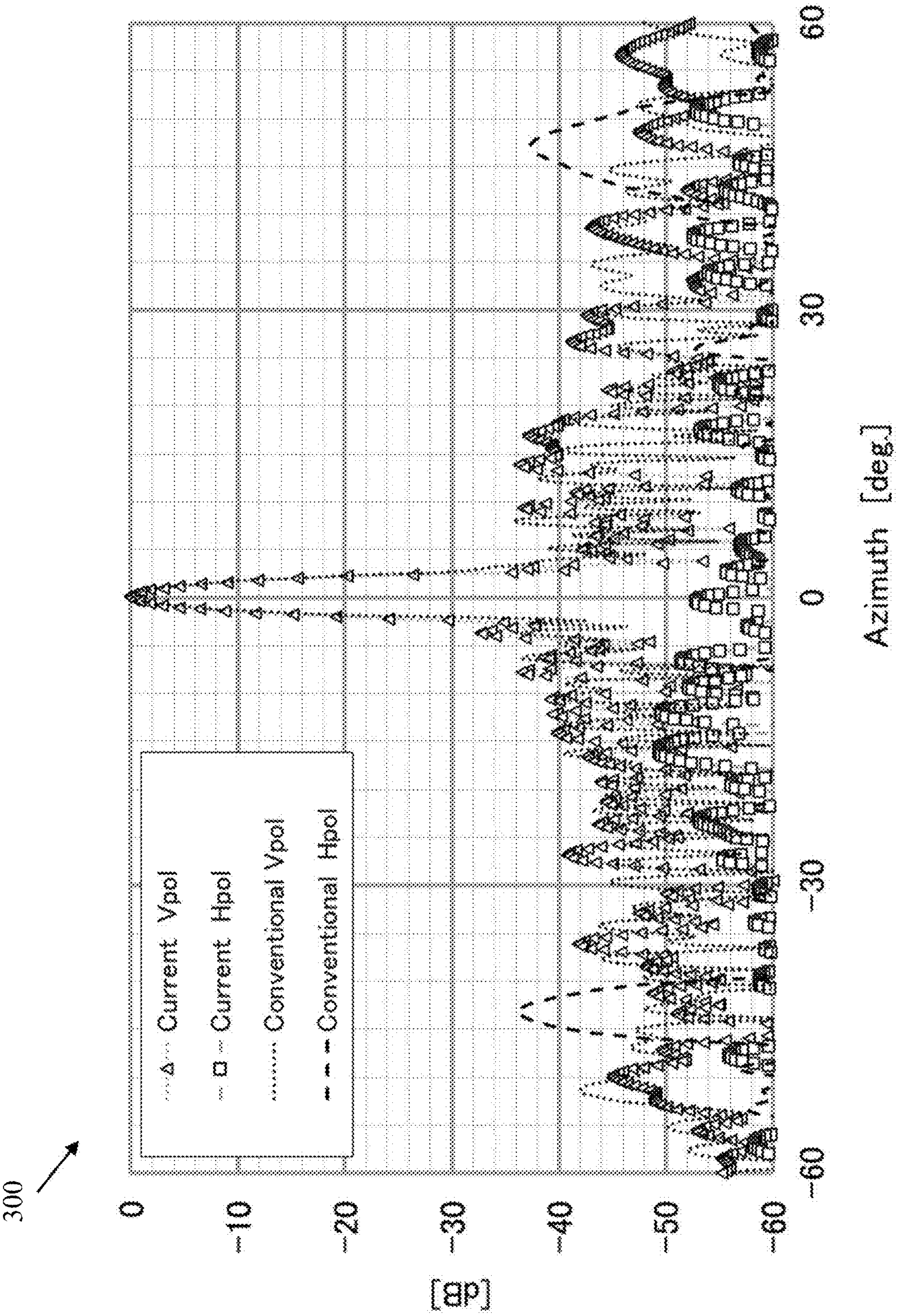
FIG. 3 illustrates a graph showing a radiation pattern of the slot array antenna according to one embodiment of the present disclosure.

FIG. 3 illustrates a graph 300 showing a radiation pattern of the slot array antenna 1 according to one embodiment of the present disclosure. The graph 300 illustrates a strength of vertically and horizontally polarized radio waves with respect to an azimuth for conventional slot array antenna and the slot array antenna 1. By setting the opening width of the second narrow opening 34 of the horn 3 near the plurality of slots 22 as less than or equal to one fifth of the wavelength, the horizontal polarization cannot propagate, and the side lobe due to the horizontal polarization is suppressed. This technique can realize a low-sidelobe, vertically polarized slot array antenna 1 without a cross-polarization suppression grating as shown in FIG. 3.

Figure 4:
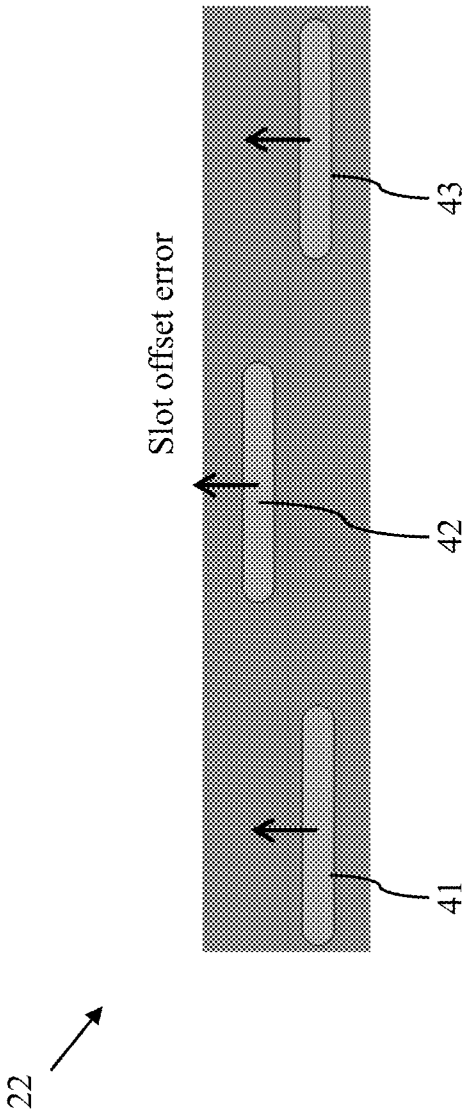
FIG. 4 illustrates a slot offset error for a plurality of slots of the slot array antenna according to one embodiment of the present disclosure.

FIG. 4 illustrates a slot offset error for the plurality of slots 22 of the slot array antenna 1 according to one embodiment of the present disclosure. The plurality of slots 22 include first through third slots 41-43. The second slot 42 has a slot offset error with respect to the first and third slots 41 and 43 as shown in FIG. 4. The second slot 42 is positioned above with respect to the first and the third slots 41 and 43 such that a difference between the positioning is represented by the slot offset error.

Figure 5:
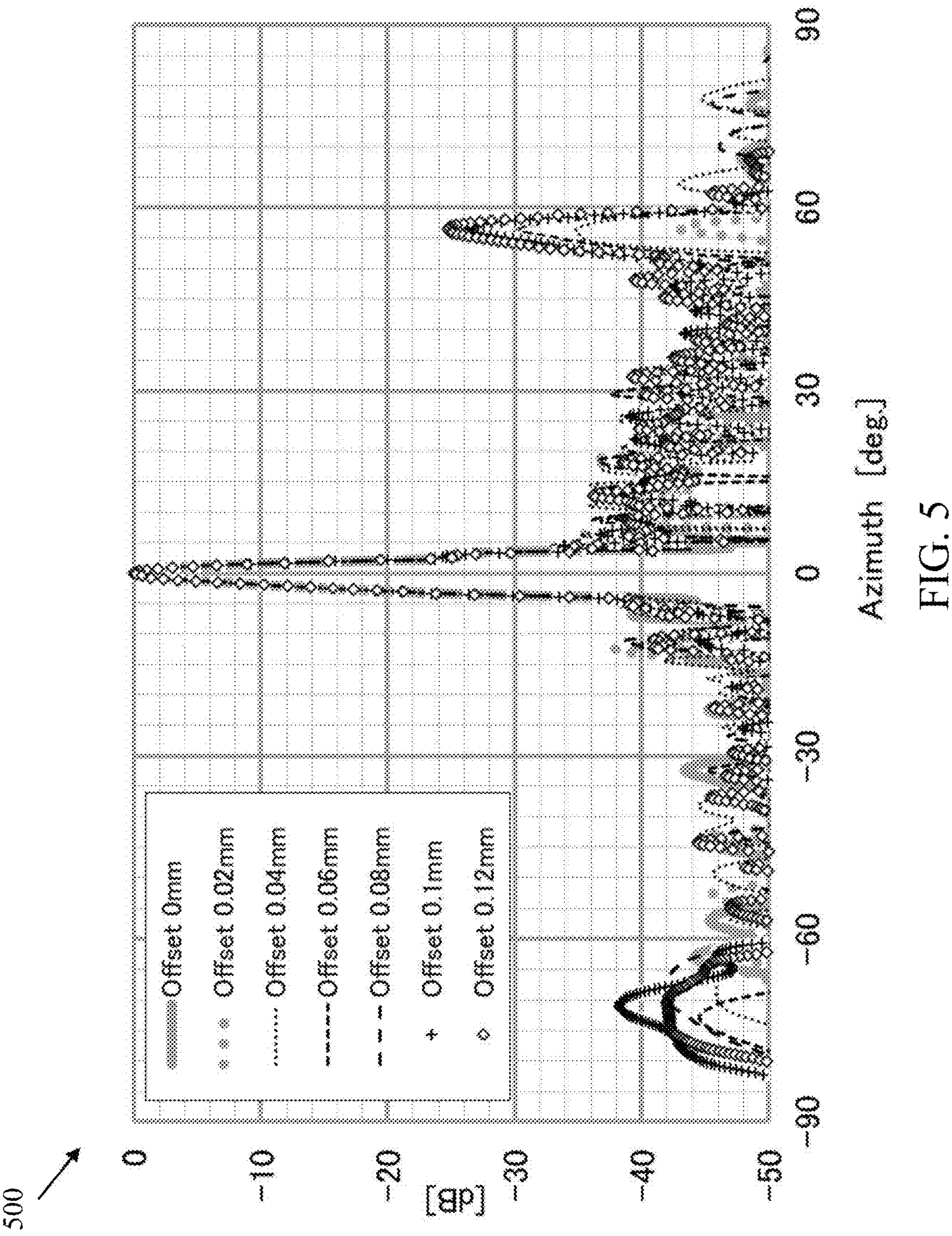
FIG. 5 illustrates a graph showing a radiation pattern of the slot array antenna according to one embodiment of the present disclosure.

When the plurality of slots 22 have a slot offset error as shown in FIG. 4, the sidelobe deteriorates as shown in FIG. 5. FIG. 5 illustrates a graph 500 showing a radiation pattern of the slot array antenna 1 according to one embodiment of the present disclosure. The graph 500 illustrates a strength of radio waves associated with various slot offset errors of the slot array antenna 1 with respect to an azimuth.

Figure 6:
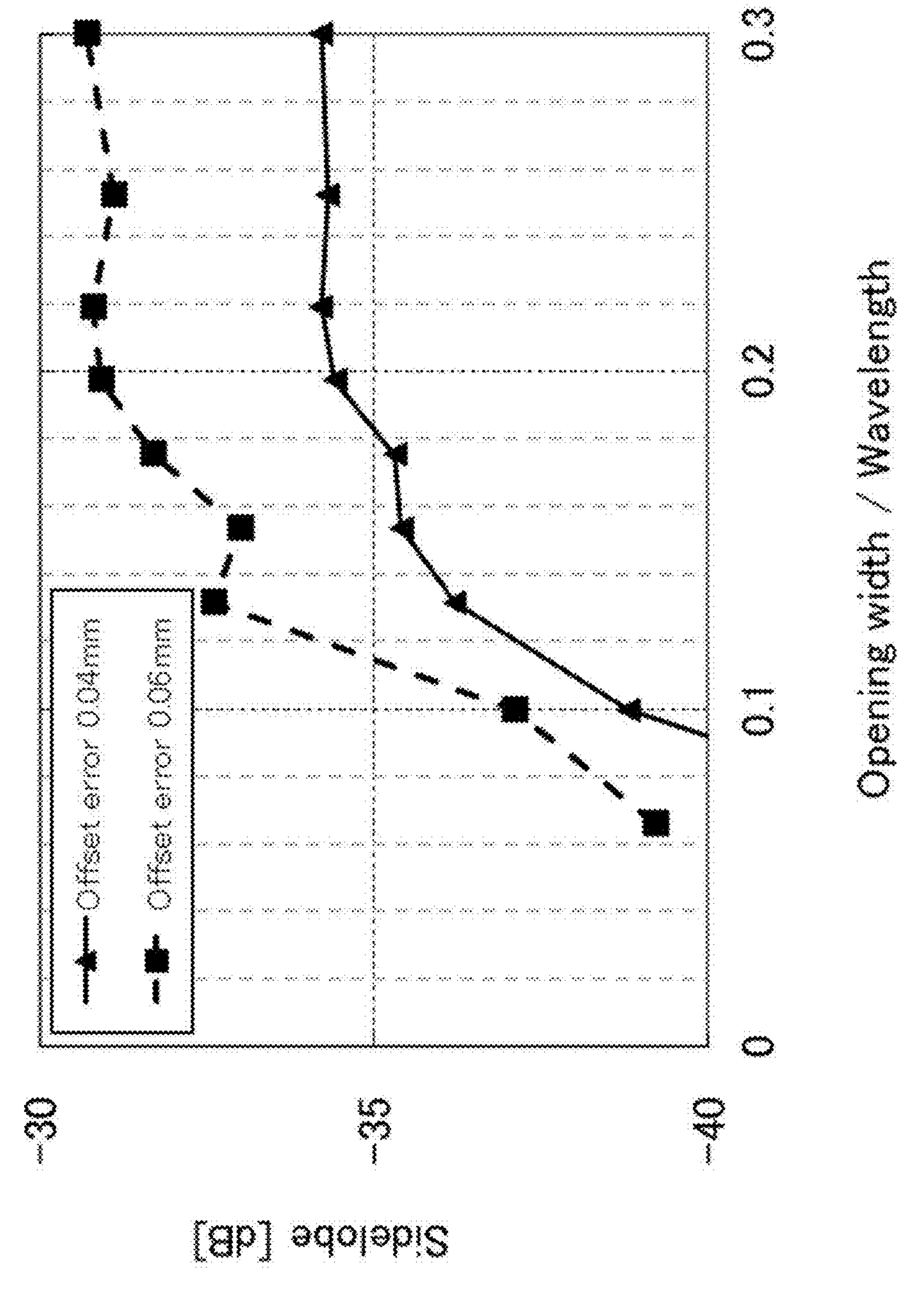
FIG. 6 illustrates a graph showing a relation between a strength of the sidelobe, the opening width and the wavelength for different slot offset errors according to one embodiment of the present disclosure.

The sidelobes are be suppressed by making the opening width of between the upper and lower portions 32 and 33 of the horn 3, i.e., the opening width of the second narrow opening, less than or equal to one fifth of the wavelength (0.2λ) as shown in FIG. 6. FIG. 6 illustrates a graph 600 showing a relation between a strength of the sidelobe, the opening width and the wavelength for different slot offset errors according to one embodiment of the present disclosure.

Figure 7:
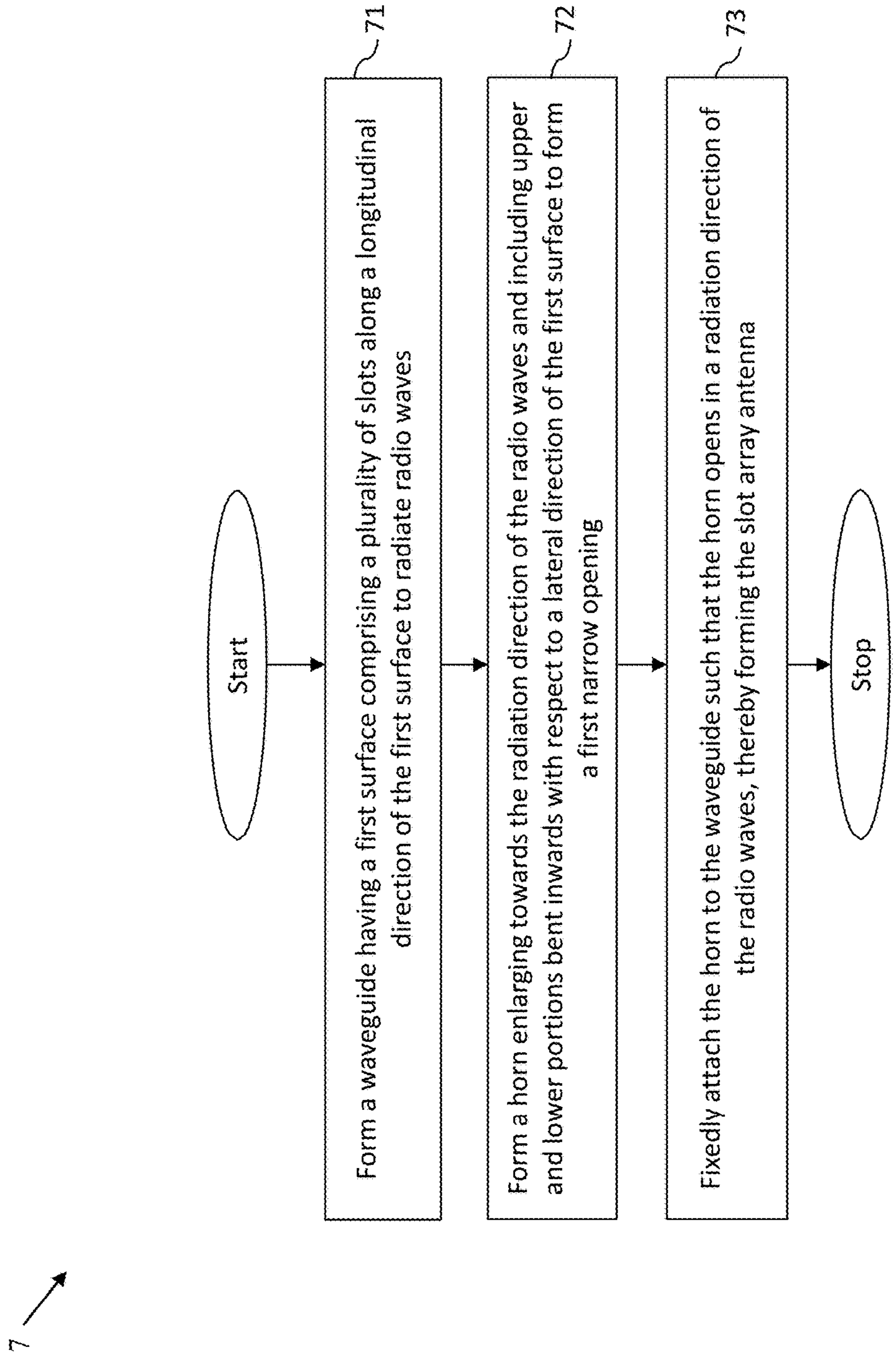
FIG. 7 represents a flow chart illustrating a method for assembling the slot array antenna according to one embodiment of the present disclosure.

FIG. 7 represents a flow chart illustrating a method 7 for assembling the slot array antenna 1 according to one embodiment of the present disclosure.

At step 71, the waveguide 2 is formed having the first surface 21 including the plurality of slots 22 arranged along the longitudinal direction of the first surface 21 to radiate the radio waves. At step 72, the horn 3 is formed that enlarges towards the radiation direction of the radio waves and includes the upper portion 32 and a lower portion 33 bent inwards with respect to the lateral direction of the first surface 21 to form the first narrow opening 31.

At step 73, the horn 3 fixedly attaching to the waveguide 2 such that the horn 3 opens in a radiation direction of the radio waves, thereby forming the slot array antenna 1. The width of the first surface 21 is greater than half of a wavelength of the radio waves. An opening width of the first narrow opening 31 is less than the width of the first surface 21, thereby suppressing a side lobe generated due to horizontal polarization of the radio waves.

The slot array antenna of the present disclosure is composed of a waveguide and a horn. The horn has an upper portion and a lower portion that are bent inwards to form first and second narrow openings. The opening width of the first narrow opening is less than or equal to half of the wavelength. The opening width of the second narrow opening is less than or equal to one fifth of the wavelength. By setting the distance between upper and lower portions of the horn near the plurality of slots to λ/5 or less, the horizontal polarization cannot propagate, and the side lobe due to the horizontal polarization is suppressed. This technique thus may be utilized to realize a low-sidelobe, vertically polarized slot antenna without using a cross-polarization suppression grating.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A slot array antenna, comprising:

a waveguide having a first surface comprising a plurality of slots arranged along a longitudinal direction of the first surface to radiate radio waves; and a horn having a slot shape, fixedly attached to the waveguide, enlarging towards a radiation direction of the radio waves, comprising an upper portion and a lower portion each having flat surfaces that are bent inwards with respect to a lateral direction of the first surface to form a first narrow opening, the horn being open on each side that is orthogonal the radiation direction of the radio waves, wherein:

an opening width of the first narrow opening is less than the width of the first surface, the upper portion and the lower portion are further bent inwards with respect to the lateral direction of the first surface to form a second narrow opening, and an opening width of the second narrow opening is less than or equal to two fifths of a wavelength.

2. The slot array antenna of claim 1, wherein the opening width of the second narrow opening is less than or equal to one fifth of the wavelength.

3. The slot array antenna of claim 1, wherein the upper portion and the lower portion form a horn shape along the radiation direction beyond the second narrow opening.

4. The slot array antenna of claim 1, wherein each of the upper portion and the lower portion has a first bend at an edge of the first surface inwards along the width of the first surface and a second bend along the radiation direction, thereby forming the first narrow opening.

5. The slot array antenna of claim 4, wherein each of the upper portion and the lower portion has a third bend at a predetermined distance from the second bend such that the third bend is inwards along the width of the first surface and a fourth bend along the radiation direction, thereby forming the second narrow opening.

6. The slot array antenna of claim 4, wherein the upper portion and the lower portion of the horn partially overlap with the first surface of the waveguide.

7. The slot array antenna of claim 1, wherein the waveguide is an elongated hollow structure.

8. The slot array antenna of claim 7, wherein the hollow structure is a rectangular hollow structure.

9. A method for assembling a slot array antenna, the method comprising:

forming a waveguide having a first surface comprising a plurality of slots arranged along a longitudinal direction of the first surface to radiate radio waves;

forming a horn having a slot shape and enlarging towards a radiation direction of the radio waves and comprising an upper portion and a lower portion each having flat surfaces that are bent inwards with respect to a lateral direction of the first surface to form a first narrow opening, the horn being open on each side that is orthogonal the radiation direction of the radio waves; and fixedly attaching the horn to the waveguide, wherein:

an opening width of the first narrow opening is less than the width of the first surface, the upper portion and the lower portion are further bent inwards with respect to the lateral direction of the first surface to form a second narrow opening, and an opening width of the second narrow opening is less than or equal to two fifths of a wavelength.

10. The method of claim 9, wherein an opening width of the second narrow opening is less than or equal to one fifth of the wavelength.

11. The method of claim 9, wherein the upper portion and the lower portion form a horn shape along the radiation direction beyond the second narrow opening.

12. The method of claim 9, wherein each of the upper portion and the lower portion has a first bend at an edge of the first surface inwards along the lateral direction of the first surface and a second bend along the radiation direction, thereby forming the first narrow opening.

13. The method of claim 12, wherein each of the upper portion and the lower portion has a third bend at a predetermined distance from the second bend such that the third bend is inwards along the lateral direction of the first surface and a fourth bend along the radiation direction, thereby forming the second narrow opening.

* * * * *